United States Patent
Nishi et al.

(10) Patent No.: US 12,454,101 B2
(45) Date of Patent: Oct. 28, 2025

(54) PROCESSING MACHINE

(71) Applicant: DMG MORI CO., LTD., Yamatokoriyama (JP)

(72) Inventors: Syuichi Nishi, Yamatokoriyama (JP); Yasumitsu Shiratsukayama, Yamatokoriyama (JP)

(73) Assignee: DMG MORI CO., LTD., Yamatokoriyama (JP)

( * ) Notice: Subject to any disclaimer, the term of this patent is extended or adjusted under 35 U.S.C. 154(b) by 138 days.

(21) Appl. No.: 17/611,120

(22) PCT Filed: May 14, 2020

(86) PCT No.: PCT/JP2020/019229
§ 371 (c)(1),
(2) Date: Nov. 12, 2021

(87) PCT Pub. No.: WO2020/230843
PCT Pub. Date: Nov. 19, 2020

(65) Prior Publication Data
US 2022/0219398 A1    Jul. 14, 2022

(30) Foreign Application Priority Data
May 15, 2019 (JP) .................. 2019-091991

(51) Int. Cl.
*B29C 64/364* (2017.01)
*B29C 64/106* (2017.01)
(Continued)

(52) U.S. Cl.
CPC .......... *B29C 64/364* (2017.08); *B29C 64/106* (2017.08); *B29C 64/255* (2017.08);
(Continued)

(58) Field of Classification Search
CPC ... B29C 64/364; B29C 64/321; B29C 64/255; B29C 64/35; B29C 64/106; B29C 64/25
See application file for complete search history.

(56) References Cited

U.S. PATENT DOCUMENTS

2012/0251378 A1    10/2012 Abe et al.
2018/0133796 A1*    5/2018 Kawada ................. B33Y 40/00
(Continued)

FOREIGN PATENT DOCUMENTS

CN       102574333 A      7/2012
CN       108067616 A      5/2018
(Continued)

OTHER PUBLICATIONS

Machine translation of Horibe JP2018027612A Composite Machining Apparatus, accessed on ESpacenet Jun. 27, 2023 (Year: 2018).*

*Primary Examiner* — Alison L Hindenlang
*Assistant Examiner* — Erica Hartsell Funk
(74) *Attorney, Agent, or Firm* — IP Business Solutions, LLC.

(57) ABSTRACT

A processing machine performs additive manufacturing processing for a workpiece with a molten material. Processing machine includes a first cover having a first wall and a second wall that face each other in a horizontal 5 direction and forming a processing area between first wall and second wall. First wall is provided with a first opening allowing air to flow into processing area. Processing machine further includes an induction flow generator that generates an air flow flowing from below to upward along second wall. First cover is provided with a second opening allowing the air to 10 flow out of processing area.

17 Claims, 3 Drawing Sheets

(51) Int. Cl.
  *B29C 64/255* (2017.01)
  *B29C 64/321* (2017.01)
  *B29C 64/35* (2017.01)
  *B33Y 30/00* (2015.01)
  *B33Y 40/00* (2020.01)

(52) U.S. Cl.
  CPC ............ *B29C 64/321* (2017.08); *B29C 64/35* (2017.08); *B33Y 30/00* (2014.12); *B33Y 40/00* (2014.12)

(56) References Cited

U.S. PATENT DOCUMENTS

| | | | |
|---|---|---|---|
| 2018/0281284 A1* | 10/2018 | Elgar | .................... B29C 64/371 |
| 2019/0009337 A1* | 1/2019 | Nicaise | ................... B22F 10/25 |
| 2019/0099943 A1 | 4/2019 | Connell | |
| 2019/0143410 A1 | 5/2019 | Kawada et al. | |

FOREIGN PATENT DOCUMENTS

| | | | |
|---|---|---|---|
| JP | 2008-100232 A | 5/2008 |
| JP | 2012-224919 A | 11/2012 |
| JP | 2016-107454 A | 6/2016 |
| JP | 2016-153529 A | 8/2016 |
| JP | 2018-027612 A | 2/2018 |
| JP | 2018-127710 A | 8/2018 |
| JP | 6410912 B | 10/2018 |
| WO | 2011-049143 A1 | 4/2011 |
| WO | 2017086317 A1 | 5/2017 |

\* cited by examiner

PROCESSING MACHINE

TECHNICAL FIELD

The present invention relates to a processing machine.

BACKGROUND ART

In relation to a conventional processing machine, for example, WO 2011/49143 (PTL 1) discloses an apparatus manufacturing a three-dimensional shaped object by using a powder sintering lamination method. In the apparatus manufacturing a three-dimensional shaped object, a supply nozzle is provided on a wall surface of a chamber. A local gas flow is formed in the chamber by supplying a gas from the supply nozzle. As a result, at least a part of fume generated by powder sintering lamination is discharged to outside of the chamber accompanying the local gas flow.

In addition to the above disclosure, Japanese Patent Laying-Open No. 2012-224919 (PTL 2), Japanese Patent Laying-Open No. 2018-127710 (PTL 3), Japanese Patent Laying-Open No. 2016-107454 (PTL 4), and Japanese Patent Laying-Open No. 2016-153529 (PTL 5) are documents disclosing conventional processing machines.

CITATION LIST

Patent Literature

PTL 1: WO 2011/49143
PTL 2: Japanese Patent Laying-Open No. 2012-224919
PTL 3: Japanese Patent Laying-Open No. 2018-127710
PTL 4: Japanese Patent Laying-Open No. 2016-107454
PTL 5: Japanese Patent Laying-Open No. 2016-153529

SUMMARY OF INVENTION

Technical Problem

Examples of a method of performing additive manufacturing (AM) processing for a workpiece by a molten material include directed energy deposition (DED), selective laser melting (SLM), thermal spraying, and the like. Use of such methods generates particulates (fume) by the AM processing for the workpiece, and thus the particulates are required to be discharged from the processing area efficiently.

Meanwhile, in the apparatus manufacturing a three-dimensional shaped object disclosed in PTL 1, it is attempted to discharge fume by forming a local gas flow in the chamber and accompanying the fume with the gas flow. However, since the fume generated at a processing point of the powder sintering lamination is widely diffused in the chamber, it is difficult to efficiently discharge the fume by the local gas flow in the chamber.

Therefore, an object of the present invention is to solve the above problem, and to provide a processing machine capable of efficiently discharging particulates generated by additive manufacturing processing for a workpiece from a processing area.

Solution to Problem

A processing machine according to the present invention is a processing machine that performs additive manufacturing processing for a workpiece with a molten material. The processing machine includes a first cover having a first wall and a second wall that face each other in a horizontal direction and forming a processing area between the first wall and the second wall. The first wall is provided with a first opening allowing a gas to flow into the processing area. The processing machine further includes an induction flow generator that generates a gas flow flowing from below to upward along the second wall. The first cover is provided with a second opening allowing the gas to flow out from the processing area.

The processing machine configured as described above can generate a gas flow flowing from below to upward along the second wall (hereinafter, referred to as "induction flow") by the induction flow generator. As a result, a gas flow along the horizontal direction that the gas flowing into the processing area through the first opening flows from the first wall provided with the first opening toward the second wall through which the induction flow flows, and an upward gas flow that the gas flowing from the first wall toward the second wall flows from below to upward by being guided by the induction flow can be generated in the processing area. The particulates generated in the processing area due to the AM processing are carried by this gas flow and is discharged to outside through the second opening, and thus the particulates can be efficiently discharged.

The processing machine preferably further includes a second cover that forms an accommodation space and accommodates, in the accommodation space, a material powder supply device that supplies the material powder toward the processing area. The induction flow generator includes a first blower that supplies a gas from the accommodation space into the processing area, and a duct that feeds the gas supplied from the accommodation space into the processing area as a gas flow flowing from below to upward.

In the processing machine configured as described above, by operating the first blower, the particulates generated in the accommodation space can also be carried by the induction flow and discharged to outside. Therefore, the particulates can be discharged from both the processing area and the accommodation space with a simple configuration.

The processing machine preferably further includes a dust collector, a second blower that supplies a gas from the processing area to the dust collector through the second opening, and a control unit that controls the first blower and the second blower. The control unit operates the first blower and the second blower while the AM processing for the workpiece is performed, and operates the first blower and stops the second blower while the additional manufacturing processing for the workpiece is not performed and the material powder is refilled to the material powder supply device.

In the processing machine configured as described above, the first blower and the second blower are selectively operated in accordance with timing at which particulates are generated in each of the processing area and the accommodation space. This makes it possible to discharge the particulates from the processing area and the accommodation space while suppressing energy consumption in the blower.

The first cover preferably further includes a ceiling. The second opening is provided in the ceiling.

In the processing machine configured as described above, since the ceiling is located ahead of the induction flow flowing from below to upward, the particulates can be more efficiently discharged to outside through the second opening.

The induction flow generator preferably includes a duct having an outlet and feeding a gas into the processing area through the outlet. The outlet is provided at a position as high as the first opening or at a position lower than the first opening.

The processing machine configured as described above can allow the gas flowing from the first wall toward the second wall to collide with the induction flow more reliably. This facilitates generation of an upward gas flow flowing from below to upward, and thus the particulates can be more efficiently discharged to outside.

The processing machine preferably further includes a rectifying mechanism that is provided with the first opening and changes a gas flowing into the processing area into a gas flow along the horizontal direction.

In the processing machine configured as described above, since the gas flowing into the processing area through the first opening easily reaches the induction flow, the particulates can be more efficiently discharged to outside.

Advantageous Effects of Invention

As described above, in accordance with the present invention, it is possible to provide the processing machine capable of efficiently discharging particulates generated by the AM processing for a workpiece from the processing area.

DESCRIPTION OF EMBODIMENTS

Figure 1:
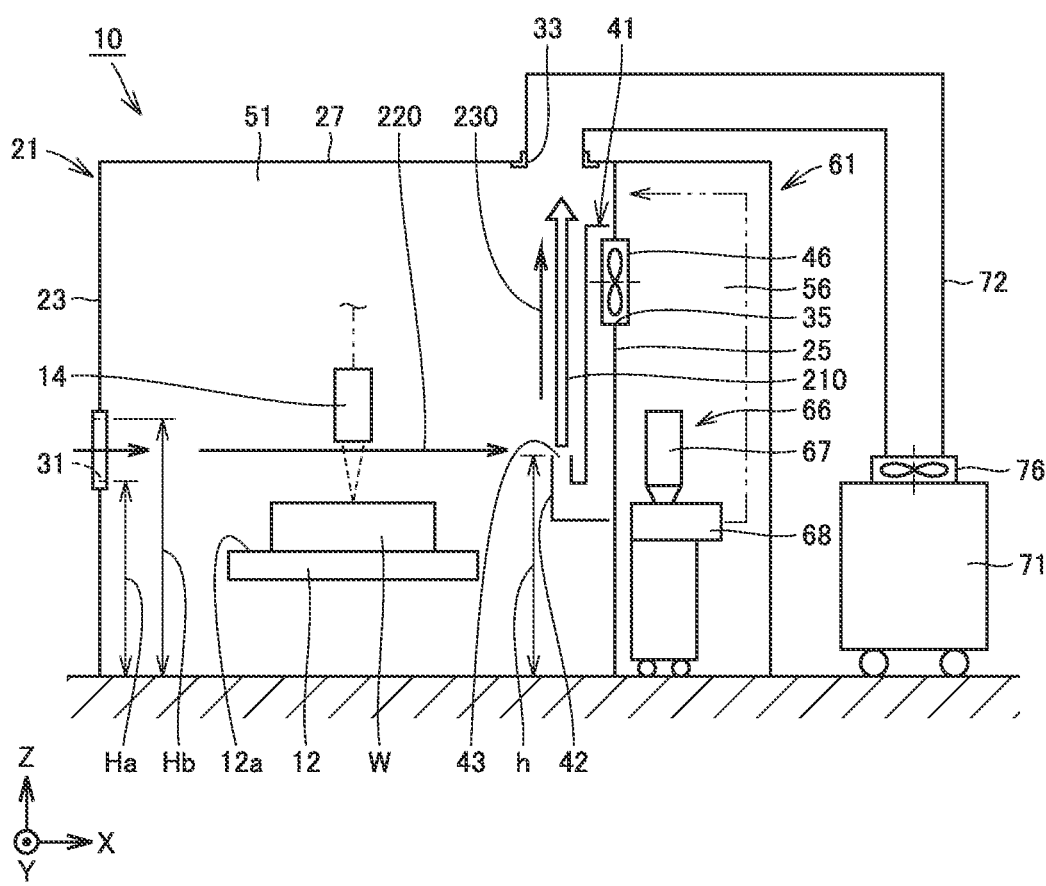
FIG. 1 is a front view of a processing machine according to an embodiment of the present invention.

An embodiment of the present invention will be described with reference to the drawings. In the drawings referred to below, the same or corresponding members are denoted by the same reference signs.

FIG. 1 is a front view of a processing machine according to the embodiment of the present invention. FIG. 1 illustrates an inner side of the processing machine in transparent view of a front surface of a cover having appearance of the processing machine.

Referring to FIG. 1, a processing machine 10 is a processing machine capable of performing additive manufacturing (AM) processing for a workpiece with a molten material. The AM processing refers to a processing method of creating a three-dimensional shape on a workpiece by attaching a material, and a mass of the workpiece increases after the AM processing as compared with before the AM processing.

Processing machine 10 is a numerical control (NC) processing machine in which various operations for workpiece processing are automated by numerical control by a computer.

Processing machine 10 may be a processing machine capable of only the AM processing for a workpiece, or may be an AM/SM hybrid processing machine capable of the AM processing for a workpiece and subtractive manufacturing (SM) processing for a workpiece.

Processing machine 10 includes a first cover 21, a processing head 14, and a workpiece moving stage 12.

First cover 21 forms a processing area 51 for performing the AM processing on a workpiece W.

Processing head 14 is provided in processing area 51. A laser beam and a material powder are introduced into processing head 14. Processing head 14 includes a nozzle for discharging the material powder and a laser beam irradiation device for irradiating workpiece W with the laser beam (not illustrated). Processing head 14 performs the AM processing on workpiece W by discharging the material powder and irradiating workpiece W with the laser light (directed energy deposition (DED)). Workpiece moving stage 12 is provided in processing area 51. Workpiece moving stage 12 faces processing head 14 in a Z-axis direction parallel to a vertical direction. Workpiece moving stage 12 is provided below processing head 14. Workpiece moving stage 12 has a placement surface 12a. Placement surface 12a is formed of a plane (referred to as an "X-axis-Y-axis plane") including an X-axis parallel to a horizontal direction and a Y-axis parallel to the horizontal direction and orthogonal to the X-axis. Workpiece W is placed on placement surface 12a. Workpiece moving stage 12 is configured to be able to hold workpiece W placed on placement surface 12a.

Workpiece moving stage 12 moves workpiece W in the X-axis-Y-axis plane by various feeding mechanisms, guide mechanisms, a servomotor, and the like. By moving workpiece moving stage 12, a processing point of the AM processing on workpiece W can be moved.

In a configuration where processing head 14 irradiating workpiece W with the laser light and supplying the material powder, and workpiece moving stage 12 holding workpiece W are mutually moved, the processing point of the AM processing on workpiece W can be moved. For example, processing head 14 may move in air in processing area 51, or this configuration may be combined with workpiece moving stage 12.

Processing machine 10 further includes a second cover 61 and a material powder supply device 66.

Second cover 61 is provided side by side with first cover 21. Second cover 61 forms an accommodation space 56. Processing area 51 and accommodation space 56 are arranged in an X-axis direction.

Material powder supply device 66 is accommodated in accommodation space 56. Material powder supply device 66 supplies the material powder used for the AM processing toward processing head 14. Material powder supply device 66 includes a material powder tank 67 and a mixer 68. Material powder tank 67 has a tank shape and stores the material powder used for the AM processing. Mixer 68 is provided below material powder tank 67. Mixer 68 is configured to be able to mix the material powder and carrier gas.

Material powder tank 67 is provided with a refill port (not illustrated) used for refilling the material powder into the tank. A height from a floor surface on which processing machine 10 is installed to the refill port may be, for example, greater than or equal to 1.2 m, or greater than or equal to 1.5 m.

In addition to material powder supply device 66, a laser oscillator (not illustrated) that oscillates the laser beam used for the AM processing may be accommodated in accommodation space 56.

First cover 21 includes a first wall 23, a second wall 25, and a ceiling 27. First wall 23 and second wall 25 face each other in the X-axis direction. First wall 23 and second wall 25 are provided apart from each other in the X-axis direction. First wall 23 and second wall 25 have a flat plate shape parallel to a Y-axis-Z-axis plane.

Processing area 51 is formed between first wall 23 and second wall 25.

Ceiling 27 is provided at a top of processing area 51. Ceiling 27 is connected to an upper end of first wall 23 and an upper end of second wall 25.

As a typical example, first cover 21 further includes an openable and closable door (not illustrated). The door is provided on a front surface of first cover 21 on a front side (transparent in FIG. 1) on the sheet illustrating FIG. 1. The door is provided on the front surface of first cover 21, different from first wall 23 and second wall 25. The door is closed when processing head 14 is performing the AM processing on workpiece W, and the door is opened when a user needs to access processing area 51 to attach or detach workpiece W to or from workpiece moving stage 12, or the like.

Second wall 25 is located between processing area 51 and accommodation space 56 in the X-axis direction. Processing area 51 and accommodation space 56 are separated by second wall 25.

First wall 23 is provided with a first opening 31. First opening 31 is an opening allowing air to flow into processing area 51. First opening 31 is formed of a through hole penetrating first cover 21 (first wall 23). Processing area 51 and an external space (for example, an indoor space such as a factory where processing machine 10 is installed) outside processing area 51 communicate with each other through first opening 31.

First opening 31 is provided at a position above and away from the floor surface on which processing machine 10 is installed. First opening 31 is provided at a position higher than placement surface 12a of workpiece moving stage 12 in the Z-axis direction (corresponding to a case where placement surface 12a is at a position lower than a lower end of an opening surface of first opening 31).

Without limited to the above configuration, first opening 31 may be provided at a position as high as placement surface 12a of workpiece moving stage 12 in the Z-axis direction (corresponding to a case where placement surface 12a is at a height between an upper end and the lower end of the opening surface of first opening 31). First opening 31 may be provided at a position lower than placement surface 12a of workpiece moving stage 12 in the Z-axis direction (corresponding to a case where placement surface 12a is at a position higher than the upper end of the opening surface of first opening 31).

First opening 31 may have another application (an application of discharging chips to outside of the machine, for example, in a case where processing machine 10 is an AM/SM hybrid processing machine) in addition to an application of allowing air to flow into processing area 51.

First opening 31 may be provided with a blower allowing air to flow into processing area 51 forcibly.

First cover 21 is further provided with a second opening 33. Second opening 33 is an opening allowing air to flow out from processing area 51. Second opening 33 is formed of a through hole penetrating first cover 21.

Second opening 33 is provided at a position higher than first opening 31 in the Z-axis direction. Second opening 33 is provided at a position higher than processing head 14 and workpiece moving stage 12 in the Z-axis direction. Second opening 33 is provided at a position apart from first wall 23 and second wall 25 in the X-axis direction. Second opening 33 is provided at a position closer to second wall 25 than first wall 23 in the X-axis direction (distance from second wall 25 to second opening 33 in the X-axis direction<distance from first wall 23 to second opening 33 in the X-axis direction).

Second opening 33 is provided in ceiling 27. Second opening 33 is formed of a through hole penetrating ceiling 27.

An opening area of second opening 33 may be larger than an opening area of first opening 31, or may be smaller than or equal to the opening area of first opening 31.

Figure 2:
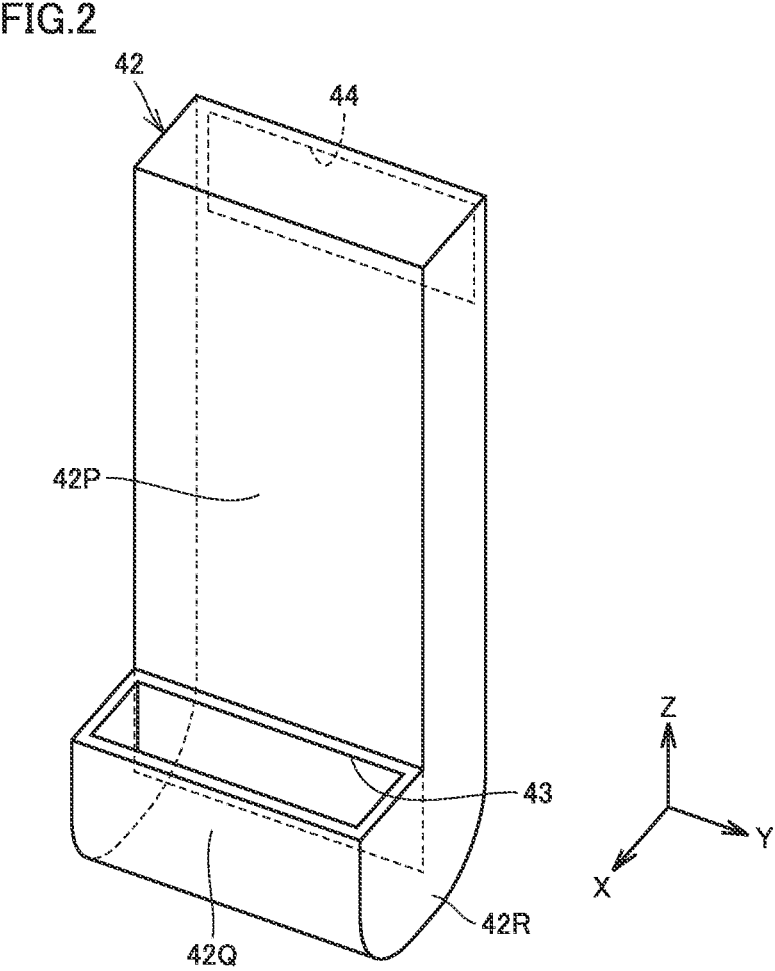
FIG. 2 is a perspective view of a duct of an induction flow generator in FIG. 1.

FIG. 2 is a perspective view of a duct of an induction flow generator in FIG. 1. Referring to FIGS. 1 and 2, processing machine 10 further includes an induction flow generator 41. Induction flow generator 41 is provided in second wall 25. Induction flow generator 41 generates an air flow flowing from below to upward along second wall 25 in processing area 51.

Induction flow generator 41 includes a first blower 46 and a duct 42. First blower 46 allows air to flow into processing area 51 while operating. First blower 46 is attached to second wall 25. While operating, first blower 46 allows air to flow from accommodation space 56 into processing area 51.

Duct 42 has a duct shape and forms a flow path through which air flows. Duct 42 is provided in processing area 51. Duct 42 is attached to second wall 25. Duct 42 feeds the air supplied from first blower 46 into processing area 51 as an air flow flowing from below to upward.

Duct 42 includes an inlet 44, an upstream portion 42P, a reverse portion 42R, a downstream portion 42Q, and an outlet 43. Inlet 44, upstream portion 42P, reverse portion 42R, downstream portion 42Q, and outlet 43 are provided side by side in that order from an upstream side to a downstream side of the air flow in duct 42.

Inlet 44 is open at one end of duct 42. Inlet 44 is overlapped with an opening 35 (see FIG. 1) provided in second wall 25. Accommodation space 56 and a space in duct 42 communicate with each other through opening 35 and inlet 44. First blower 46 is connected to inlet 44.

Inlet 44 is provided at a position higher than outlet 43 in the Z-axis direction. Inlet 44 is provided at a position higher than first opening 31 in the Z-axis direction. Inlet 44 is provided at a position lower than second opening 33 in the Z-axis direction.

Upstream portion 42P extends in the Z-axis direction along second wall 25. Upstream portion 42P extends downward from inlet 44. Upstream portion 42P may have a tapered shape such that a flow path area of the air decreases downward. Reverse portion 42R is connected to a lower end of upstream portion 42P. Reverse portion 42R is provided so as to be reversed by 180° from upstream portion 42P while being curved in a direction toward first wall 23 in the X-axis direction. Downstream portion 42Q is connected to an upper end of reverse portion 42R. Downstream portion 42Q extends upward from reverse portion 42R. A length of downstream portion 42Q in the Z-axis direction is smaller than a length of upstream portion 42P in the Z-axis direction.

Outlet 43 is open at the other end of duct 42. Outlet 43 is provided at an upper end of downstream portion 42Q.

Outlet 43 is provided at a position lower than second opening 33. An opening surface of outlet 43 faces an opening surface of second opening 33 in the Z-axis direction.

Outlet 43 may be provided at a position as high as first opening 31 in the Z-axis direction. This case corresponds to a case where the opening surface of outlet 43 is at a height between the upper end and the lower end of the opening surface of first opening 31 (in FIG. 1, Ha≤h≤Hb). Outlet 43 may be provided at a position lower than first opening 31 in the Z-axis direction. This case corresponds to a case where the opening surface of outlet 43 is at a position lower than the lower end of the opening surface of first opening 31 (in FIG. 1, h<Ha).

Outlet 43 is preferably provided at a position overlapping first opening 31 in a Y-axis direction.

The air supplied from first blower 46 flows into duct 42 through inlet 44. The air flowing into duct 42 flows from above to below through upstream portion 42P. The air flow flowing from above to below is reversed to the air flow flowing from below to upward in reverse portion 42R. After flowing from below to above in downstream portion 42Q, the air is sent into processing area 51 as an air flow flowing from below to upward through outlet 43.

Processing machine 10 further includes a dust collector 71, a second blower 76, and a dust collecting duct 72.

Dust collector 71 is provided in the external space of processing area 51. Dust collector 71 is connected to second opening 33 through dust collecting duct 72.

While operating, second blower 76 supplies air from inside of processing area 51 to dust collector 71 through second opening 33. Second blower 76 is incorporated in dust collector 71. Second blower 76 may be provided in second opening 33 or may be provided on a path of dust collecting duct 72.

Next, functions and effects provided by processing machine 10 according to the embodiment will be described.

At the processing point of workpiece W, the material powder changes into steam, the steam is cooled, and thus fume of fine particulate (for example, particles of less than or equal to 1 μm) is generated in processing area 51. Further, when the material powder is refilled to material powder supply device 66 (material powder tank 67), the material powder (for example, powder of about 50 μm) may fly in accommodation space 56. These particulates are required to be efficiently discharged from inside of processing area 51 or inside of accommodation space 56 for health reasons of the user or the like.

Therefore, in processing machine 10 according to the embodiment, the fume generated in processing area 51 and the material powder flying in accommodation space 56 are collected in dust collector 71 through dust collecting duct 72.

Here, induction flow generator 41 generates an air flow flowing from below to upward along second wall 25 (an air flow (induction flow) indicated by an outlined arrow 210 in FIG. 1) in processing area 51. As a result, an air flow along the horizontal direction (an air flow indicated by arrow 220 in FIG. 1) that the air flowing into processing area 51 through first opening 31 flows from first wall 23 provided with first opening 31 toward second wall 25 through which the induction flow (an air flow indicated by an arrow 230 in FIG. 1) that the air flowing from first wall 23 toward second wall 25 flows from below to upward by being guided by the induction flow can be generated.

The fume generated at the processing point of workpiece W is collected near second wall 25 by the air flow along the horizontal direction from first wall 23 toward second wall 25. The fume collected near second wall 25 is further discharged to outside of processing area 51 through second opening 33 by an upward air flow along second wall 25. Therefore, the fume generated in processing area 50 due to the AM processing can be efficiently discharged to outside.

Second opening 33 is provided in ceiling 27. In this configuration, the ceiling is located ahead of the upward air flow along second wall 25, and thus the fume in processing area 51 can be more efficiently discharged through second opening 33.

Further, in a case where outlet 43 is provided at a position as high as first opening 31 or at a position lower than first opening 31, the air flow along the horizontal direction from first wall 23 toward second wall 25 can more reliably collide with the induction flow. As a result, an upward air flow along second wall 25 is likely to occur, and thus the fume in processing area 51 can be more efficiently discharged to outside.

Induction flow generator 41 generates the induction flow by allowing air to flow into processing area 51 from accommodation space 56 along with the operation of first blower 46. Thus, the material powder flying in accommodation space 56 is also guided into processing area 51 through duct 42 and then discharged to outside by the induction flow fed from outlet 43. As a result, not only the fume generated in processing area 51 but also the material powder flying in accommodation space 56 are discharged to outside by induction flow generator 41, and thus a particulate discharge mechanism in processing machine 10 can have a simple configuration.

Figure 3:
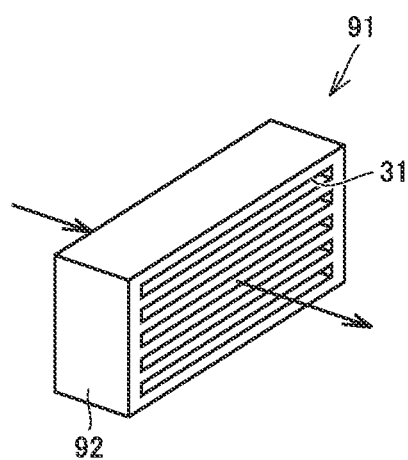
FIG. 3 is a perspective view illustrating a modification of a first opening in FIG. 1.

FIG. 3 is a perspective view illustrating a modification of the first opening in FIG. 1. Referring to FIGS. 1 and 3, in the modification, processing machine 10 further includes a rectifying mechanism 91. Rectifying mechanism 91 is provided with first opening 31. Rectifying mechanism 91 changes the air flowing into processing area 51 into an air flow along the horizontal direction.

Rectifying mechanism 91 includes a block body 92. Block body 92 is provided with a plurality of first openings 31. The plurality of first openings 31 is arranged in the vertical direction. The first openings 31 extend in a slit shape along the Y-axis direction.

In this configuration, the air flowing into processing area 51 through first opening 31 easily reaches the induction flow along second wall 25, and thus the particulates can be more efficiently discharged to outside.

Figure 4:
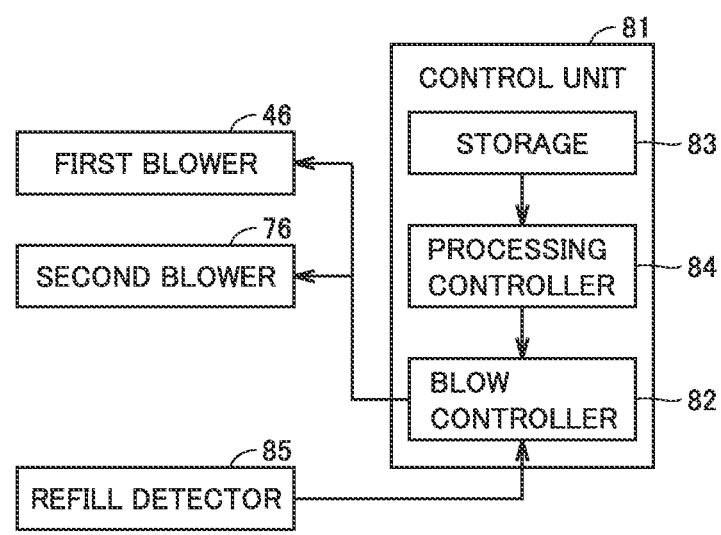
FIG. 4 is a block diagram related to control of a first blower and a second blower.

FIG. 4 is a block diagram related to control of the first blower and the second blower. Referring to FIGS. 1 and 4, processing machine 10 further includes a control unit 81. Control unit 81 is a control panel that is provided in processing machine 10 and controls various operations in processing machine 10. Control unit 81 controls first blower 46 and second blower 76.

Control unit 81 includes a blow controller 82, a storage 83, and a processing controller 84. Blow controller 82 controls operations of first blower 46 and second blower 76. Storage 83 stores a processing program (numerical control program) created by the user of processing machine 10. Processing controller 84 executes the processing program stored in storage 83 in accordance with an instruction from the user.

Blow controller 82 determines whether the AM processing for the workpiece is performed on the basis of the processing program executed in processing controller 84.

Material powder supply device 66 further includes a refill detector 85. Refill detector 85 detects refilling of the material powder to material powder supply device 66 (material powder tank 67). For example, refill detector 85 is provided at the refill port for the material powder in material powder tank 67, and includes a sensor capable of detecting the material powder charged to the refill port.

An openable and closable lid member is provided in the refill port of material powder tank 67. In this case, refill detector 85 may include a sensor capable of detecting that the lid member is opened.

Upon receipt of a signal from refill detector 85, blow controller 82 determines whether material powder supply device 66 is refilled with the material powder.

Control unit 81 operates first blower 46 and second blower 76 while the AM processing for the workpiece is performed. Control unit 81 operates first blower 46 and second blower 76 regardless of whether the material powder is refilled to material powder supply device 66 while the AM processing for the workpiece is performed.

Control unit 81 operates first blower 46 and stops second blower 76 while the AM processing for the workpiece is not performed and the material powder is refilled to material powder supply device 66.

While the AM processing for the workpiece is not performed and the material powder is refilled to material powder supply device 66, only first blower 46 is operated to supply air from accommodation space 56 into processing area 51, and thus the material powder flying in accommodation space 56 is fed into processing area 51. When the AM processing for the workpiece is performed, the material powder flying in accommodation space 56 and the fume generated in processing area 51 are discharged to outside by operating both first blower 46 and second blower 76 discharge. This makes it possible to clean the atmosphere in accommodation space 56 and processing area 51 at an appropriate timing and suppress energy consumption in the blowers.

To summarize a structure of processing machine 10 according to the embodiment of the present invention described above, processing machine 10 according to the embodiment is a processing machine that performs the AM processing for a workpiece with a molten material. Processing machine 10 includes first cover 21 having first wall 23 and second wall 25 that face each other in the horizontal direction and forming processing area 51 between first wall 23 and second wall 25. First wall 23 is provided with first opening 31 allowing air as a gas to flow into processing area 51. Processing machine 10 further includes induction flow generator 41 that generates an air flow flowing from below to upward along second wall 25. First cover 21 is provided with second opening 33 that allows air to flow out from processing area 51.

Processing machine 10 according to the embodiment of the present invention configured as described above can efficiently discharge particulates (fume) generated due to the AM processing for the workpiece from processing area 51.

The AM processing performed by the processing machine of the present invention may adopt, for example, a directional energy deposition method in which a wire is fed to a workpiece instead of the material powder in the embodiment. The AM processing performed by the processing machine of the present invention may adopt a selective laser melting method or thermal spraying.

It should be understood that the embodiment disclosed herein is illustrative in all respects and not restrictive. The scope of the present invention is defined not by the above description but by the claims, and is intended to include meanings equivalent to the claims and all modifications within the scope.

INDUSTRIAL APPLICABILITY

The present invention is applied to a processing machine that performs additive manufacturing processing.

REFERENCE SIGNS LIST

10: processing machine, 12: workpiece moving stage, 12a: placement surface, 14: processing head, 21: first cover, 23: first wall, 25: second wall, 27: ceiling, 31: first opening, 33: second opening, 41: induction flow generator, 42: duct, 42p: upstream portion, 42q: downstream portion, 42r: reverse portion, 43: outlet, 44: inlet, 46: first blower, 51: processing area, 56: accommodation space, 61: second cover, 66: material powder supply device, 67: material powder tank, 68: mixer, 71: dust collector, 72: dust collecting duct, 76: second blower, 81: control unit, 82: blow controller, 83: storage, 84: processing controller, 85: refill detector, 91: rectifying mechanism, 92: block body

The invention claimed is:

1. A processing machine that performs additive manufacturing processing for a workpiece with a molten material at a position, the processing machine comprising:
    a first cover having a first wall and a second wall that face each other in a horizontal direction and defining a processing area between the first wall and the second wall, the first wall including a first opening thereon allowing a gas to flow into the processing area, the processing area being configured within the first cover;
    the processing machine further comprising
        an induction flow generator that generates a gas flow flowing from below to upward along the second wall, the first cover being including a second opening thereon allowing the gas to flow out from the processing area;
    the processing machine further comprising
        a second cover that is disposed outside of the first cover and defining an accommodation space which is disposed outside of the first cover and is separated from the processing area, and
        a material powder supply device that is disposed in the accommodation space that is outside of the first cover and is configured to supply a powder material from the accommodation space toward the processing area via the first cover,
    the induction flow generator including
        a first blower that supplies a gas from the accommodation space into the processing area via the first cover,
    the accommodation space being configured outside the first cover,
    the first blower being configured at an upper part of the second wall,
    the first blower and the second opening being configured on a side opposite to the first wall,
    the position being located between the first and second walls,
    the second wall being located between the position and the material powder supply device.

2. The processing machine according to claim 1, further comprising:
    a dust collector;
    a second blower that introduces the gas from the processing area to the dust collector through the second opening; and
    a control unit that controls the first blower and the second blower,
    wherein the control unit
    operates the first blower and the second blower while the additive manufacturing processing for the workpiece is performed, and
    operates the first blower and stops the second blower while the additive manufacturing processing for the workpiece is not performed and the material powder is refilled to the material powder supply device.

3. The processing machine according to claim 1, wherein
the first cover further includes a ceiling, and
the second opening is provided in the ceiling.

4. The processing machine according to claim 1, wherein
the induction flow generator includes a duct having an outlet and feeding a gas into the processing area through the outlet, and
the outlet is provided at a position as high as the first opening or at a position lower than the first opening.

5. The processing machine according claim 1, further comprising a rectifying mechanism that is provided with the first opening and changes the gas flowing into the processing area into a gas flow along the horizontal direction.

6. The processing machine according to claim 2, wherein
the first cover further includes a ceiling, and
the second opening is provided in the ceiling.

7. The processing machine according to claim 2, wherein
the induction flow generator includes a duct having an outlet and feeding a gas into the processing area through the outlet, and
the outlet is provided at a position as high as the first opening or at a position lower than the first opening.

8. The processing machine according to claim 3, wherein
the induction flow generator includes a duct having an outlet and feeding a gas into the processing area through the outlet, and
the outlet is provided at a position as high as the first opening or at a position lower than the first opening.

9. The processing machine according to claim 2, further comprising a rectifying mechanism that is provided with the first opening and changes the gas flowing into the processing area into a gas flow along the horizontal direction.

10. The processing machine according to claim 4, further comprising a rectifying mechanism that is provided with the first opening and changes the gas flowing into the processing area into a gas flow along the horizontal direction.

11. The processing machine according to claim 1, wherein
the accommodation space is separated from the processing area by the second wall.

12. The processing machine according to claim 11, wherein
the induction flow generator includes a duct that feeds the gas supplied from the accommodation space into the processing area as a gas flow flowing from below to upward,
the second wall is provided with an opening,
the duct includes an inlet and an outlet, and extends between the inlet and the outlet,
the inlet is connected to the opening, and
the outlet faces vertically upward and is configured to match the second opening in a vertical direction.

13. The processing machine according to claim 1, wherein
the second wall separates the accommodation space and the processing area, and
the first blower is configured on the second wall.

14. The processing machine according to claim 4, wherein
the material powder supply device includes a material powder tank storing the material power which is supplied to the processing area via the duct with the gas.

15. The processing machine according to claim 1, wherein
the first blower is configured adjacent to the second opening.

16. The processing machine according to claim 15, wherein
the second opening is configured closer to the second wall than to the first wall.

17. The processing machine according to claim 2, wherein
the second blower introduces the gas from the processing area to the dust collector through the second opening in order to flow upwardly the gas along the second wall.

* * * * *